United States Patent Office 3,467,604
Patented Sept. 16, 1969

3,467,604
MOISTURE PERMEABLE POLYION COMPLEX-RESINOUS COMPOSITES
Alan S. Michaels, Lexington, Mass., assignor to Amicon Corporation, Cambridge, Mass., a corporation of Massachusetts
No Drawing. Continuation-in-part of application Ser. No. 386,420, July 30, 1964. This application July 13, 1967, Ser. No. 653,003
Int. Cl. C08f 47/08
U.S. Cl. 260—2.5        10 Claims

ABSTRACT OF THE DISCLOSURE

Compositions comprising (1) a polyelectrolyte complex resin, advantageously a highly porous form of said resin, and (2) a hydrophobic organic polymer; these compositions are characterized by a large increase in the moisture vapor transmission rate over the rate obtainable with compositions containing no polyelectrolyte complex resin. The highly-porous forms of polyelectrolyte complex resins most suitable for use in the invention are characterized by low bulk densities and very high surface areas; they are capable of increasing moisture vapor transmission rates of hydrophobic-polymer films into which they are incorporated by about an order of magnitude even when incorporated at loadings below 20% by weight of total polymer.

RELATED APPLICATION

This application is a continuation-in-part of Ser. No. 386,420 filed on July 30, 1964 by Alan S. Michaels and entitled Moisture Permeable Polyion Complex-Resinous Composites. That application is now abandoned.

BACKGROUND OF THE INVENTION

This invention relates to the quest for durable organic polymer compositions characterized by a high degree of water-vapor permeability and by anti-static properties, and to a method of making such compositions. More specifically, this invention relates to such compositions containing, dispersed therein, finely divided particles of a polyelectrolyte resin of special characteristics.

Hydrophobic, organic polymer compositions of both thermoplastic and thermosetting nature are well known, and widely used for the manufacture of unsupported film, sheeting protective and/or decorative coatings on woven and non-woven fabrics, paper, and leather, and as components of laminated structures along with fabrics, and felted sheet-materials such as paper, leather, etc. Many of the aforementioned articles possess mechanical and structural properties which make them eminently suitable for use in wearing apparel, footwear, upholstery, surgical dressings and the like; however, these materials lack the important property of high permeability to water vapor, which is required to provide the necessary comfort to the human organism when clothed in or contacted with these materials.

On the other hand, there are many hydrophilic, organic polymer compositions which possess water-vapor permeabilities more than adequate for human comfort; however, these materials possess mechanical, structural, and/or chemical properties which render them useless in the manufacture of the aforementioned articles. Most hydrophilic polymers, for example, are either soluble in, or swell markedly when contacted with, water, and become hard and brittle when dried. Furthermore, most hydrophilic polymers have relatively low strength and elongation when wet.

In an effort to combine the desirable mechanical and structural properties of hydrophobic polymers with the desirable moisture-permeability of hydrophilic polymers, it has been proposed to disperse a finely divided hydrophilic polymer with controlled water-swellability in a hydrophobic polymer, thereby producing a two-phase composite, of which the hydrophobic polymer is the continuous phase. In order that the composite should display good dimensional stability and retain mechanical strength under wet conditions, it is essential that the dispersed hydrophilic polymer be chemically modified so as to prevent excessive water-absorption and swelling. However, the very steps which in the past have been taken to minimize such water-absorption and swelling (e.g., chemical crosslinking by means of covalent bonds) operate to reduce the water-vapor permeability of the hydrophilic polymer and, hence, of the composite prepared therewith.

Among various hydrophilic polymers which have in the past been used for this purpose are formaldehyde-crosslinked polyacrylamide, and reaction-products of certain anionic polyelectrolytes (e.g., polyacrylates, polyvinylphosphonates) with certain cationic polyelectrolytes (polyamines, quaternary ammonium polymers) crosslinked via epoxy or vinyl groups. Composites prepared with reasonable concentrations of these hydrophilic polymers display modest improvements in moisture vapor permeability relative to those of the hydrophobic polymer components alone; however, at concentrations of hydrophilic polymer sufficient to impart significantly high moisture-vapor permeability, the desirable mechanical properties of strength and durability attributable to the hydrophobic polymer component are either lost or seriously impaired.

SUMMARY OF THE INVENTION

The composite products of the present invention comprise a hydrophobic organic polymer having dispersed therein finely divided particles of a special ionically crosslinked polyelectrolyte. The products of the invention are unique in their properties of absorbing relatively small amounts of water—up to about 30% by weight of the polyelectrolyte content at 100% relative humidity—while exhibiting extremely high moisture permeability or transmissivity. Other materials or products displaying comparable moisture permeability absorb many times as much water under the same conditions, and suffer a corresponding loss of such important properties as tensile strength, modulus, elongation, abrasion-resistance, tear-resistance, etc.

One object of the present invention is to provide hydrophobic organic polymer compositions having a high moisture vapor permeability or transmissivity and good strength as well as insolubility and resistance to swelling in water.

Another object is to provide a composition of the type described having as a continuous phase a hydrophobic film-forming low-moisture-permeability polymer containing dispersed therein discrete particles of ionically crosslinked polyelectrolyte polymer, the oppositely charged ionic groups of which have ionization constants greater than $10^{-2}$.

Other and further objects will be apparent from the description which follows.

The composition of the present invention is two-phase, of which the continuous phase or binder comprises a hydrophobic organic polymer having low moisture permeability. It may be either thermoplastic or thermosetting in nature; in the latter case the finished product may be completely thermoset. In most cases it is desirable that the binder polymer be film-forming and that it be flexible or elastic; among such materials are natural rubber, neoprene, polymers of butadiene or of isoprene, e.g., cis-polybutadiene, copolymers of butadiene or of other dienes with styrene or acrylonitrile, copolymers of isobutylene with small proportions of butadiene, polyolefins such as polyethylene, polypropylene, polyisobutylene, and copolymers of such olefins with each other or with dienes, e.g., ethylene-propylene copolymer elastomers, polymers and copolymers of esters of acrylic acid and of methacrylic acid, cellulose esters and ethers such as cellulose acetate, cellulose butyrate, ethyl cellulose, or hydroxyethyl cellulose, plasticized polyvinyl chloride, internally plasticized polyvinyl chloride i.e. copolymers of vinyl chloride with vinyl acetate, and polyurethanes. The elastomers or rubbers may be either vulcanized or unvulcanized. Other hydrophobic organic polymers which may be used as the binder include such vinyl polymers as polyvinyl chloride (unplasticized), polyvinyl acetate, polyvinyl butyrate, polyvinyl acetal, polyvinyl butyral, polymers and copolymers of vinylidene chloride, polymers and copolymers of styrene, methyl styrene, chlorostyrene, etc., superpolyamides, polysiloxanes, phenol-formaldehyde resins, urea-formaldehyde resins, melamine-formaldehyde resins, polyester and polycarbonate resins, polymers of tetrafluoroethylene and of monochlorotrifluoroethylene, and the like.

The finely divided ionically crosslinked polyelectrolyte, particles of which are dispersed in the continuous phase or binder polymer, are polymers formed of two ionically associated synthetic organic linear polymers, one of the polymers having dissociable anionic groups attached to a polymeric chain which, without the anionic groups, forms a water-insoluble film-forming resin, and the other of the linear polymers having dissociable cationic groups attached to a polymeric chain which likewise, without said cationic groups, forms a water-insoluble film-forming resin. It is essential that the ionic association form the sole bond between the two linear polymers and that the anionic and cationic groups present be those which in aqueous solution display ionization constants greater than $10^{-2}$, and that each of the linear polymers have sufficient dissociable groups to render it soluble in water in the absence of the other polymer. These ionically crosslinked polyelectrolyte polymers may be prepared in finely divided form in the manner described in my copending application Ser. No. 340,531 filed Jan. 27, 1964, but now abandoned.

Among the polymers containing dissociable cationic groups which may be used as ingredients in preparing the ionically crosslinked polyelectrolytes useful in the present invention are poly(ethylene methyloxonium) chloride, poly(vinyl dimethyloxonium) chloride, poly(vinyl benzyldimethylsulfonium) chloride, poly(vinyl benzyltrimethylphosphonium) chloride, poly(vinylbenzyltrimethylammonium) chloride, and the like. Among the polymers containing anionic groups which may be used in preparing the polyelectrolytes used in the present invention are poly(alpha-fluoro acrylic acid), poly(2,2 - dichloro - 3 - butenoic acid), poly(4-vinylphenyl difluoro acetic acid), polyvinyl sulfuric acid, polyvinyl sulfonic acid, polyvinyl methylol sulfonic acid, polyvinyl toluene sulfonic acids, polystyrene sulfonic acid, poly-alpha-methylstyrene sulfonic acid, and alkali metal salts thereof, preferably the sodium or potassium salts. Of these, the sulfonic acid polymers and their alkali metal salts are preferred.

It has also been discovered that it is advantageous to maintain the polyelectrolyte complex resins loading in compositions below about 25% of total polymer, and preferably not above between about 15 to 20% of total polymer. These lower loadings can be achieved with relatively little deterioration, or no deterioration, in the physical properties of the compositions into which they are incorporated. Moreover it has been discovered that more useful and relevant data on moisture-vapor transmission can be achieved at such lower polyelectrolyte complex resin loadings because, unlike at higher loadings, there is no substantial "false surface" provided by the protrusion of polyelectrolyte filler above the surface of the film which "false surface" tends to provide unrealistically high moisture vapor transmission rate data. It has also been discovered that a novel form of polyelectrolyte complex resins, which form is characterized by its high porosity, low bulk density, and high ester absorption characteristics, imparts greatly increased moisture vapor transmission rates to polymeric compositions in which it is incorporated.

The molecular weight, of the organic linear polymers which may be interacted to produce the ionically crosslinked polyelectrolytes which are useful in the present invention, is not critical. However, the molecular weights of each polymer (i.e. both the polymer containing cationic groups and the polymer containing anionic groups) is preferably at least 50,000 so that the polymer is solid and capable of film formation, each polymer preferably having at least one ionic group (anionic or cationic as the case may be) for every six repeating monomeric units in the chain, or at least one such ionic group for each average chain interval of 12 carbon atoms in polymers containing a chain of carbon atoms in the backbone of the polymer molecule.

For best results, both in terms of enhanced moisture-permeability and good mechanical strength, the size of the particles of ionically crosslinked polyelectrolyte should be as small as possible, in no event greater than 50 microns, and preferably well below one micron in their greatest dimension. The particles are preferably in the colloidal size range, from 0.01 to 5 microns in their greatest dimension.

Highly preferred for incorporation into the compositions of the invention are certain highly porous or "expanded" polyelectrolyte resins characterized by their very low bulk density and high porosity. Incorporation of these materials into the compositions of the invention, even at moderately low loadings such as 10 to 20% by weight, results in extraordinary increases in moisture vapor transmission characteristics of articles fabricated from the compositions while substantially maintaining the physical strength of articles.

For many applications, the desired moisture permeability can be achieved without appreciable sacrifice in mechanical properties (i.e. tensile strength, modulus, elongation, abrasion-resistance, tear-resistance, etc.) if the proportion of crosslinked polyelectrolyte particles is from 5% to 50% by volume of the total composition.

The compositions of the present invention may be prepared in a variety of ways. Preformed particles of crosslinked polyelectrolyte may be mixed with a solution or dispersion of the binder polymer, and the liquid vehicle or solvent may then be removed in any conventional manner, as by evaporation, centrifugation, filtration, etc. The particles of crosslinked polyelectrolyte may also be formed in situ in a solution or dispersion of the binder polymer. Pre-formed particles of polyelectrolyte may also be mixed with the solid binder polymer in a mill or dough mixer, preferably at elevated temperature. Preferably the compositions are prepared by fusing the binder polymer when the latter is thermoplastic, then mixing or dispersing the dry particulate ionically crosslinked polyelectrolyte into the melt which is subsequently cooled in the desired shape. In another preferred procedure the binder polymer is dissolved in a volatile organic solvent, and the dry polyelectrolyte particles are stirred or mixed into the solution, after which the solvent is evaporated. In some cases, e.g. plastisol type vinyl polymers such as polyvinyl chloride, both the ionically crosslinked polyelectrolyte particles and the particles of vinyl polymer are dispersed in the liquid plasticizer, after which the resulting plastisol is shaped and heated to dissolve the vinyl polymer particles, then cooled in the desired shape.

The particles of ionically crosslinked polyelectrolyte may be prepared as described in the copending application of Michaels et al. Ser. No. 341,834 by dissolving both the organic linear polymer containing anionic groups in stoichiometric proportions in an aqueous medium containing sufficient ion shielding electrolyte to maintain the two polymers in solution. The aqueous medium may be water alone or it may be a mixture of water with a low-polarity miscible liquid. The shielding electrolyte may be a salt, acid, or base and must be present in the solution in an amount at least 10% by weight of the total solution, preferably at least 20% by weight. The electrolytes preferably employed are those which are soluble in water to the extent of at least 10% by weight at room temperature, which are highly ionized in aqueous solution and have a pK less than 2.0, and which contain no ions which interact with the polyelectrolytes to precipitate them. A variety of alkali metal, alkaline earth metal, and other metal salts as well as tetramethylammonium salts and lower-alkylpyridinium salts, such as the chlorides, bromides, nitrates and sulfates may be used. Acids which may be used include, among others, hydrochloric, hydrobromic, nitric, sulfuric, etc., and the useful bases include alkali metal hydroxides, barium hydroxides, tetramethylammonium hydroxide, and others. The low polarity liquid is preferably an organic solvent having a volatility approximately as great as that of water or even greater. Suitable solvents include, among others, acetone dioxane, methanol, ethanol, isopropanol, tert.-butyl alcohol, pyridine, morpholine, and other solvents, in amounts up to 40% by weight of the total aqueous solution.

The particles of ionically crosslinked polyelectrolyte may be obtained from the solution thus prepared by reducing the activity of the shielding electrolyte, which may be accomplished by cooling the solution, by evaporation of a liquid component, e.g. water or solvent, from the solution, by evaporating a portion of the shielding electrolyte if it be volatile, by diluting the solution or by contacting it with water or other suitable solvent to extract the micro ions, or by neutralization of acids or bases when they are employed as the shielding electrolyte. Whether or not the crosslinked polyelectrolyte is obtained directly in the form of particles of the desired size, or whether subsequent grinding or attrition of the crosslinked polyelectrolyte is necessary depends upon the conditions used.

Finely divided particles of ionically crosslinked polyelectrolyte may also be prepared by first preparing separate aqueous solutions of the organic linear polymer containing anionic groups and of the organic linear polymer containing cationic groups, the concentration of each such solution preferably being from 2% to 20% by weight. The separate solutions of polymers are then introduced simultaneously into a large mass of water, the rate of addition of each solution being adjusted so that the two reactive polymers are present in approximately stoichiometric proportions at all times. The mass of water into which the two solutions are mixed must be sufficiently large so that the total amount of water in the mixture at any time during the procedure is at least 500 times the weight of any free unreacted polymer before it has reacted to form an ionically crosslinked polyelectrolyte polymer. The individual solutions of separate polymers may be introduced as continuous streams into the mass of water, or they may be introduced intermittently, even sequentially, provided that the concentration of the free unreacted polymer present at any time does not exceed 0.2% by weight. The reaction mixture is stirred vigorously and effectively throughout the course of addition of the two reactive polymer solutions until the two polymers have reacted to form the ionically crosslinked polyelectrolyte in finely divided solid form, i.e. in the form of a flocculent precipitate which may be separated from the reaction mixture by any conventional procedure such as filtration, centrifugation, etc., the filter cake or other mass of finely divided solid material preferably being washed at least once with water in order to remove any residual impurities present in the mother liquor.

The preferred highly-porous polyelectrolyte resins can also be prepared from aqueous solutions containing shielding electrolytes, for example those solutions containing sulfuric acid or other highly hydrophilic shielding electrolytes. In such solutions to be used in obtaining highly expanded polyelectrolytes, the organic solvent is most desirably a highly volatile material. Acetone is conveniently used. Polyelectrolyte resins prepared from such shielding solutions, washed with water, and dried by means of solvent-extraction (acetone is useful for this extraction step, also) followed by air-drying and size reduction to 325 mesh are sufficiently porous to increase, the moisture vapor transmission of polyvinylchloride films up to about 500% when incorporated at 20% weight levels. These highly-porous polyelectrolyte resins are characterized by dioctyl phthalate (DOP) absorption levels above about 1.8 grams DOP per gram of polyelectrolyte resin but preferably above 5.0 grams DOP per gram of polyelectrolyte resins. They have bulk densities of less than about 0.3 gram per cc. after being passed through a 325 mesh sieve. Most advantageously, the bulk densities are below about 0.1 gram per cc.

The more highly porous forms can be prepared by first forming a polyelectrolyte complex resin according to the procedure described above wherein the free unreacted polymers present at any time does not exceed 0.2% by weight of the water in which the polymers are being reacted.

After the polymer is initially formed, it is separated from the liquid reaction medium; washed with water to remove any excess salts, monomer or solvent; and washed with a drying solvent, e.g. acetone, to remove any residual moisture. The moisture-free polyelectrolyte is then dispersed in a volatile liquid, which liquid is not a solvent nor a plasticizer therefor, and separated therefrom at a temperature above the temperature at which atmospheric moisture can condense on the polymer. Spray drying is a particularly useful separation technique when acetone is used as a volatile liquid for dispersing the polyelectrolyte.

When tested for dioctyl phthalate (DOP) absorption, such products hav absorption values of in excess of 6.8 grams of DOP per gram of polyelectrolyte. Values of 8.0 grams and higher are not uncommon.

The relative proportions of ionically crosslinked polyelectrolyte particles and of continuous phase or binder resin may vary extremely, widely depending upon the intended use of the composition. The proportion of crosslinked polyelectrolyte particles may vary from 1% to 80% by volume of the total composition. In general, the moisture vapor permeability of the composition of the present invention is preferably at least twice that of the continuous phase or binder component of the composition.

The following specific examples are intended to illustrate more fully the nature of the present invention without serving as a limitation upon its scope.

EXAMPLE 1

Approximately 100 parts by weight of dry powdered sodium polystyrene sulfonate was added together with 333 parts of an aqueous solution containing 30% by weight of polyvinyl benzyltrimethylammonium chloride to a solution consisting of 266 parts by weight of calcium nitrate tetrahydrate as shielding electrolyte, 266 parts of 1,4-dioxane, and 33 parts of water. The resulting viscous syrup, which was homogeneous and almost perfectly transparent, was mixed gradually with 20,000 parts by weight of cold tap water in a high-speed mixer. The slurry which resulted was vacuum filtered, and the filter cake was then washed with 10 to 20 times its weight of tap water. After drying at about 100° C. the hard and brittle filter cake was ground in a ball mill to produce to powder passing a 325 mesh screen.

There were mixed with 100 parts by weight of the foregoing finely powdered ionically crosslinked polyelectrolyte 50 parts by weight of conventional plastisol-grade polyvinylchloride resin and 100 parts of di(isooctyl)phthalate plasticizer. The resulting semifluid mixture was laid down in the form of a 6-mil film on a polished metal plate by means of a standard coating bar. The plate together with the deposited film was then heated to approximately 200° C. for ten minutes to fuse the composition into a coherent translucent sheet which could be stripped from the metal plate after cooling to room temperature. The film was found to be flexible, elastic and capable of about 100% elongation at break.

A sample of the film so produced was placed in a permeation cell filled with liquid water and the cell was placed in a chamber with the film exposed to a stream of air at 50% relative humidity at 25° C. The moisture vapor permeability or transmissivity of the film was then determined by measuring the loss in weight of the cell and was found to be 138 grams per twenty-four hours per 100 square inches of film, as contrasted with a value of 11 grams per twenty-four hours per 100 square inches of film for ordinary plasticized polyvinyl chloride film of equivalent thickness.

However, at loadings of polyelectrolyte resin of only 15%, instead of 67% of the total polymer, in the film composition, permeabilities of only about 30 grams per twenty-four hours per 100 square inches of film are attained.

EXAMPLE 2

There were mixed together 100 parts by weight of the finely divided crosslinked polyelectrolyte described in Example 1 and 100 parts by weight of powdered polyethylene. Sufficient xylene was then added to make a thick paste, which was thoroughly mixed until uniform and then placed in an oven at 80° C. until all of the xylene had evaporated. The resulting powder mixture was pressmolded in a hydraulic press at about 4000 p.s.i. and 300° F. for about ten minutes. A yellowish translucent coherent film was produced.

EXAMPLE 3

There was prepared as described in Example 1 a solution containing 5% by weight of sodium polystyrene sulfonate and 5% of polyvinyl benzyltrimethylammonium chloride in a mixture of 4 parts by weight of dioxane and 1 part of water. To 50 parts by weight of this solution were added approximately 5 parts of finely powdered polyethylene, and the resultant slurry was thoroughly agitated in a Waring Blendor with 500 parts by weight of water. The resulting precipitate was separated by filtration, washed, and dried three hours at 80° C. There was obtained a fine white powder which was press-molded at 4000 p.s.i. and 380° F. for twenty minutes to form a uniform clear film. Upon immersion in water for sixteen hours at room temperature, the film increased in weight by 7.9%.

EXAMPLE 4

The finely divided crosslinked polyelectrolyte described in Example 1 was dispersed in a mixture of 6 parts of ethanol with 4 parts of perchloroethylene to form a 10% by weight dispersion. There were mixed with 12.8 parts by weight of the foregoing dispersion, 12 parts of a 16% solution in the same solvent mixture of a polyetherurethane resin (Du Pont LD–388). Films of the mixture were cast on metal plates and after evaportion of the solvent and drying at room temperature the resultant product was found to be a tough elastic film having a gauge of 4 mils and containing approximately 40% by weight of crosslinked polyelectrolyte particles. The moisture vapor transmissivity of this film was 1292 grams of water per 100 square inches of film per twenty-four hours per mil thickness. In contrast, the moisture vapor transmissivity of a film of the same polyurethane containing no crosslinked polyelectrolyte particles was 81 grams per 100 square inches per twenty-four hours per mil.

EXAMPLE 5

A slurry was prepared containing 6.4% by weight of the crosslinked polyelectrolyte described in Example 1 in a mixture of equal parts of dimethylformamide and of methylethylketone. Approximately 10 parts by weight of the slurry was mixed with a solution containing 11.7 parts of a polyesterurethane resin (Estane 10X) in 42 parts of tetrahydrofuran. A film was cast upon a metal panel which after evaporation of the volatile liquids and drying fifteen minutes at 65° C. was found to be tough and elastic, having a gauge of 3.5 mils. The moisture vapor transmissivity of this film, containing approximately 20% by weight of ionically crosslinked polyelectrolyte, was 308 grams per twenty-four hours per 100 square inches per mil. Similar films containing as little as 15% by weight of ionically crosslinked polyelectrolyte displayed a moisture vapor transmissivity over 100 grams on the same scale. The physical properties i.e. tensile strength, modulus, elongation, abrasion-resistance and tear-resistance, of the films were nearly identical with those of the polyesterurethane alone. The moisture vapor transmissivity of the same polyesterurethane resin containing no crosslinked polyelectrolyte was the same as that of Example 4.

EXAMPLE 6

There was prepared a mixture containing 1.875 parts by weight of finely divided crosslinked polyelectrolyte as described in Example 1, 1.05 parts of dioctylphthalate, and 0.35 part of an epoxy resin, the diglycidyl ether of bisphenol-A having an epoxide equivalent of 170–210 (Epon– 828), together with a curing agent constsing of 0.29 part of methyl nadic anhydride and 0.004 part of tridimethyl amino methyl phenol. This slurry was mixed with a dispersion of 3.125 parts of polyvinyl chloride (Bakelite QYNV) in 1.05 parts of dioctylphthalate. A film was cast from the mixture on a ferrotype plate, degassed ten minutes in vacuum, and cured five minutes at 320° F. The resulting tough, translucent film containing 25% by weight of particulate ionically crosslinked polyelectrolyte absorbed less than 14% by weight of water after immersion for twenty-four hours at room temperature. The moisture vapor transmissivity of the film was 103 grams per 100 square inches per twenty-four hours per mil thickness. In contrast, a similar film made from the same epoxy composition, but containing no crosslinked polyelectrolyte particles, had a vapor transmissivity of approximately 30 to 40 grams per 100 square inches per twenty-four hours per mil thickness.

EXAMPLE 7

A solution was prepared containing the anionic polymer and the cationic polymer described in Example 1 in a mixture of 4 parts by weight of concentrated hydrochloric acid, 5 parts by weight of dioxane, and 1 part by weight of water. With this solution was mixed an amount of finely divided polyvinyl chloride (Bakelite QYNV) equal in weight to the weight of the two polymers. The resulting mixture was diluted rapidly with a large excess of water and the resulting precipitated product was separated, washed, and dried. Two parts by weight of the particulate solid mixture were mixed with 1 part by weight of dioctylphthalate and the resulting paste was stirred into a slurry consisting of 2 parts by weight of the same particulate polyvinyl chloride in 1.5 parts by weight of dioctylphthalate. A film was cast from this mixture and cured five minutes at 325° F. to produce a tough, translucent sheet in which the proportion of plasticized polyvinyl resin to crosslinked polyelectrolyte was 5.5 to 1. The moisture vapor transmissivity of this film was approximately 60 grams per 100 square inches per twenty-four hours per mil of thickness. On the other hand, the moisture vapor transmissivity of a similar film made from the same plasticized polyvinyl resin, but free from crosslinked polyelectrolyte particles, was approximately 35 grams per 100 square inches per twenty-four hours per mil of thickness.

EXAMPLE 8

There was prepared an aqueous dispersion containing 9.5% by weight of the particulate crosslinked polyelectrolyte of Example 1 together with 0.02% of a sodium-potassium polyphosphate containing approximately 16 phosphorus atoms per molecule. There were mixed with 15.5 parts by weight of the foregoing dispersion 5.8 parts of a latex containing 50% by weight of a self-crosslinking copolymer of vinyl chloride with acrylic ester (X2833, National Starch). A film cast from the mixture was strong and tough and had a milky white appearance. The moisture vapor transmissivity of the film was found to be 360 grams per 100 square inches per twenty-four hours per mil, while a similar film made from the same vinyl-acrylic copolymer and free from crosslinked polyelectrolyte had a moisture vapor transmissivity of only 200 grams per 100 square inches per twenty-four hours per mil.

Similar results may be obtained using other binders and other crosslinked polyelectrolyte resins.

The following examples illustrate the most advantageous modes of the invention, i.e., those incorporating the highly-expanded, porous, high-surface area polyelectrolyte resins: The test procedures by which the resins are characterized and evaluated are set forth after Example 10.

EXAMPLE 9

A first solution was prepared of:

| | Grams |
|---|---|
| Water | 800 |
| $H_2SO_4$, reagent grade | 1200 |
| Poly (sodium styrene sulfonate) | 400 |
| Acetone | 1200 |

A second solution was prepared of:

| | Grams |
|---|---|
| Water | 680.0 |
| $H_2SO_4$, reagent grade | 1200.0 |
| Poly (vinyl benzyltrimethylammonium chloride), (31% solution in water) | 132.0 |
| Acetone | 1200.0 |

The relative quantities of polyelectrolyte polymer in the above solutions were selected to provide a stoichiometric mixture in terms of polyion equivalents.

The second solution is added, with stirring, to the first solution and thereafter placed in a jar on a roll mill for about 30 minutes. The resulting polyelectrolyte solution was mixed with cold water to precipitate the polyelectrolyte complex, vacuum filtered, and washed in acetone until less than 1% of water is detected in the recovered acetone wash. After a portion of the acetone remaining on the polyelectrolyte complex is evaporated, the material is passed through a 325 mesh screen and dried. Then the remaining acetone is removed in an air-circulating oven at 60° C.

Two polyelectrolyte complex resins prepared in this way were tested for bulk density and DOP absorption. Films prepared of 85% polyvinyl chloride and 15% of the polyelectrolyte complex were tested for moisture vapor transmission rate.

| Bulk Density | DOP absorption | Moisture vapor trans. rate increase factor over PVC control |
|---|---|---|
| (1) 0.103 grams/cc | 1.95 grams/gram resin | 4.5 |
| (2) 0.150 grams/cc | 2.08 grams/gram resin | 5.2 |

EXAMPLE 10

A first solution is prepared of:

| | Grams |
|---|---|
| Poly (sodium styrene sulfonate) | 80.8 |
| Water | 1640.0 |
| Acetone | 536.0 |

A second solution is prepared of:

| | Grams |
|---|---|
| Poly (vinyl benzyltrimethylammonium chloride), (31% solution in water) | 149.2 |
| Water | 888.8 |
| Acetone | 1480.0 |

These two solutions are combined under very high shear so that the unreacted portion of each polymer is never more than about 0.2% concentration by weight of the total mixture.

A polyelectrolyte complex resin gel precipitates, settles and, after the decanting off of supernatant liquid, is washed with 4000 cc. of 22° C. distilled water three times to remove water-soluble salts, residual monomer, and any other water-soluble contaminants which may be present.

The water-washed resin gel is then washed three times again in acetone to remove substantially all residual water. Material thus desiccated is redispersed in 2 liters of acetone and sprayed onto an 80° C. surface in a stream of air.

Resultant polyelectrolyte resin gel adsorbed 6.8 grams DOP per gram of resin and, when incorporated into the standard PVC-plastisol formulation at a weight level of only 15%, showed an increase in moisture vapor transmission of 6.2 times over the transmission rate of a film of the same formulation but with no polyelectrolyte complex resin incorporated therein.

MOISTURE VAPOR TRANSMISSION TEST

A control film is formed of polyvinylchloride plasticol. This standard plastisol formulation used as a control in moisture vapor transmission tests is:

| Material— | Weight, parts |
|---|---|
| Polyvinylchloride powder | 85.0 |
| Dioctyl phthalate | 95.0 |
| Co-plasticizer | 5.0 |
| Stabilizer | 3.0 |
| Titanium dioxide | 5.0 |
| Metallic sulfonate additives | 0.5 |

The polyvinylchloride powder is available under the trade designation Geon 121 by B. F. Goodrich and Company.

The co-plasticizer is available under the trade designation Flexol E.P.O. from Union Carbide Corporation.

The stabilizer is available under the trade designation Ferro 1720 by the Ferro Stabilizer Company.

The titanium dioxide is available from the Glidden Company under the trade designation R-44.

The metallic sulfonate additive is available from the Continental Oil Company under the trade designation Demivis.

The formulation is uniformly blended on a 3-roll paint mill—4 to 6 passes usually suffice at 3.0 mil and 1.5 mil settings on the feed roll and apron roll respectively.

When polyelectrolyte complex is incorporated into the formulation to be tested one mil gaps are used on both the feed roll and apron roll. Moreover, it is usually desirable to adjust the viscosity of polyelectrolyte-containing plastisols by adding a diluent, e.g. xylene at a concentration of 6 to 8 parts per 100 parts of formulation. Such adjustment facilitates the casting of a uniform film for testing of moisture vapor transmission.

Film draw-downs are conveniently made on casting paper of the type supplied by S. D. Warren Company by means of a Gardner knife applicator. A fused film of about 5 mils thickness is used for moisture vapor transmission rate measurements. These films are placed in a vacuum chamber for 30 minutes at room temperature to remove entrapped air bubbles which, if present, would tend to distort the moisture vapor transmission data. The films are then fused at temperatures of 165° C. for 3 minutes to 3.5 minutes. Examination of pin holes is made and any film sample containing pin holes is discarded before testing.

Thereupon the test is run generally according to ASTM test E-96-63T (D-Water Method). The following deviations from the test procedure are made:

|  | ASTM test | Instant test procedure |
| --- | --- | --- |
| Temperature of test chamber | 32.2° C. | 35° C. |
| Recommended sample area | 30 cm.$^2$ | 9.5 cm.$^2$ |

OIL ABSORPTION TEST

One gram of polyelectrolyte complex is placed on a clean glass plate. Dioctyl phthalate is added dropwise to the resin and, after each drop, is thoroughly mixed into the resin with a spatula. The test is complete at a point when the DOP-resin composition suddenly becomes a coherent mass rather than merely a damp powder. At this point the composition can be picked up on the spatula without flow. Results are reported in terms of grams of DOP absorbed per gram of polyelectrolyte resin.

The poly (sodium styrene sulfonate) used in the foregoing examples has a molecular weight in the range from about 3 to 5 million. The poly (vinyl benzyltrimethylammonium chloride) is available from Dow Chemical Company under the trade names QX-2611.7, QX-3521 and the like.

The compositions of the present invention are useful for a variety of purposes. In particular, when in the form of sheets or films, which may be reinforced or strengthened by means of fibers, threads, or yarns woven or unwoven, they are useful as moisture-permeable wrapping or packaging material. The composition may also be employed as a coating directly on the object to be protected, whether it be metallic, ceramic, or organic in nature. Of particular importance is the use of the compositions in sheet or film form for upholstery materials, wearing apparel, including footwear, e.g. raincoats, protective gloves, shoe leather substitutes, diaper-covers, etc. The anti-static properties of the compositions make them especially useful in conveyor belts, surgical sheeting, hose lining for gasoline or jet-fuel hoses, etc.

In general, the compositions of the present invention retain the ease of fabrication, physical stability, strength, flexibility or resiliency, heat sealability, and water repellency of the binder material to whatever extent these properties are present in the binder material. The compositions are unique, however, in having extraordinarily high moisture vapor transmissivity and anti-static properties.

Among other applications in which the products of the invention have found utility is the formation of high-moisture vapor membranes for fuel cells, for example expanded polyelectrolyte complex resin in a modacrylic resin such as that sold under the trade designation Dynel by Union Carbide Corporation. Normally thin films are desired for such applications, in such cases the polyelectrolyte complex resin may be conveniently dispersed in a solution of the polymer in which it is to be incorporated, and a film may be cast from the solution.

Although specific embodiments of the invention have been described herein, it is not intended to limit the invention solely thereto, but to include all of the variations and modifications which suggest themselves to one skilled in the art within the spirit and scope of the appended claims.

What is claimed is:

1. In a composition characterized by a high degree of water-vapor permeability and comprising finely divided polyelectrolyte complex resin particles dispersed in a hydrophobic organic polymer, the improvement wherein said polyelectrolyte complex resin is (a) from 1 to 80% by weight of the total composition; is (b) formed of two ionically associated synthetic organic linear polymers, one of said polymers having dissociable anionic groups attached to a polymeric chain which without the said anionic groups forms a water insoluble film-forming resin, and the other of said polymers having dissociable cationic groups attached to a polymeric chain which without said cationic groups forms a water insoluble-film-forming resin, said ionic association forming the sole bond between said polymers and said anionic and cationic groups being selected from those which in aqueous solution display ionization constants greater than $10^{-2}$, each of said ionically-associated polymers having sufficient dissociable groups to render it soluble in water in the absence of the other; and (c) said particles of said resin are porous and characterized by a dioctyl phthalate absorption value of at least 5.0 grams of polyelectrolyte complex resin and a bulk density of less than about 0.3 gram per cubic centimeter.

2. A composition as claimed in claim 1 in which said anionic groups are sulfonate and said cationic groups are quaternary ammonium.

3. A composition as claimed in claim 1 in the form of a film in which said particles amount to 5% to 50% by weight of the total weight of said composition and said binder polymer is film-forming.

4. A composition as claimed in claim 1 in which said binder comprises a resilient thermoplastic organic polymer.

5. A composition as claimed in claim 1 in which the first said organic linear polymer is polystyrene sulfonate and the other said polymer is polyvinyl benzyltrimethylammonium chloride.

6. A composition as claimed in claim 1 in which said binder comprises polyvinyl chloride and a liquid plasticizer therefor.

7. A composition as defined in claim 1 wherein the weight percent of polyelectrolyte resin is less than about 20% of the total polymer in said composition.

8. The method of making a composition as claimed in claim 4 which comprises fusing said thermoplastic organic polymer, dispersing said particles of polyelectrolyte therein, and cooling the resultant mixture.

9. The method of making a composition as claimed in claim 4 which comprises dissolving said thermoplastic organic polymer in a volatile organic solvent, dispersing said particles of polyelectrolyte in said solution, then evaporating said solvent.

10. The method of making a composition as claimed in claim 6 which comprises dispersing said polyvinyl chloride in finely-divided form and said particles of polyelectrolyte in said liquid plasticizer, heating the resultant mix to dissolve the polyvinyl chloride, and cooling the resultant mix.

References Cited

UNITED STATES PATENTS

| | | | |
|---|---|---|---|
| 2,832,746 | 4/1958 | Jackson | 260—899 |
| 2,832,747 | 4/1958 | Jackson | 260—899 |
| 3,004,904 | 10/1961 | Gregor et al. | 260—899 |
| 3,004,909 | 10/1961 | Gregor et al. | 260—899 |

OTHER REFERENCES

Helfferich: "Ion Exchange," McGraw-Hill, 1962, pp. 14, 15, 28 and 29.

SAMUEL H. BLECH, Primary Examiner

MORTON FOELAK, Assistant Examiner

U.S. Cl. X.R.

260—2.1, 2.2, 17.4, 31.8, 41, 823, 844, 851, 859, 873, 874, 887, 897, 899, 901